United States Patent Office 3,477,933
Patented Nov. 11, 1969

3,477,933
PROCESS FOR PREPARING N-MONOSUBSTI-
TUTED CARBAMIC ACID ESTERS
Walter A. Stamm, Tarrytown, and Carl C. Greco, New
York, N.Y., assignors to Stauffer Chemical Company,
New York, N.Y., a corporation of Delaware
No Drawing. Continuation-in-part of application Ser. No.
411,124, Nov. 13, 1964. This application June 6, 1966,
Ser. No. 555,222
Int. Cl. B01j 1/10; C07c 3/24
U.S. Cl. 204—162          20 Claims

ABSTRACT OF THE DISCLOSURE

N-monosubstituted carbamic esters of the type

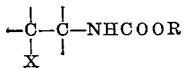

where X is a halogen and R is an alkyl or aryl group are prepared by reacting, in the presence of actinic radiation or a chemical agent for producing free radicals, an N-monohalocarbamic ester with an unsaturated organic compound having at least one nonaromatic carbon to carbon double bond.

---

This application is a continuation-in-part of U.S. Ser. No. 411,124 filed Nov. 13, 1964, which is in turn a continuation-in-part of U.S. Ser. No. 328,177 filed Dec. 5, 1963, both now abandoned.

This invention relates to the preparation of N-substituted carbamic acid esters and, more particularly, the invention relates to a process for the preparation of N-mono-substituted carbamic acid esters.

It is known in the art to prepare N-disubstituted carbamic acid esters of the type wherein both amino hydrogen atoms are replaced by either a nitro- or a chloro-function and a haloalkyl moiety, for example. The synthesis of such N-disubstituted carbamic acid esters from N-chloro-N-nitrocarbamate and an olefinic unsaturated hydrocarbon such as, e.g., ethylene or cyclohexene is described in U.S. Patent No. 2,772,306 and, from N-dichlorocarbamate and an olefinic unsaturated hydrocarbon in "Annales de Chimie," vol. 17 (1942), pp. 355-356. These reported syntheses result in the formation of N-disubstituted carbamates at temperatures up to about 100° C. under essentially atmospheric pressure conditions without the aid of catalytic material. Unfortunately, the N-monohalocarbamic acid esters unlike the N-dihalocarbamic acid esters and the N-halo-N-nitro carbamic acid esters, are found to be unreactive with olefinic unsaturated compounds under the reaction conditions suggested in the prior art. That is to say, N-monosubstituted carbamic acid esters unlike the N-disubstituted carbamic acid esters cannot be formed directly by reaction with olefinic unsaturated material in accordance with procedures taught in the prior art. The economical, direct production of the N-monosubstituted carbamic esters is desirable, however, since such compounds are known to be readily convertible to valuable isocyanate materials by reaction with phosphorus pentoxide, for example, whereas the N-disubstituted carbamate esters are not useful in this regard. It is therefore the principal object of the present invention to overcome and eliminate the inherent deficiencies of the prior art by providing a process for the direct production of N-monosubstitued carbamic acid esters.

Another object is to provide a process for making N-monosubstituted carbamic acid esters from starting materials which include an olefinic unsaturated reactant, i.e., an unsaturated organic reactant containing at least one carbon-carbon double bond which is not a part of an aromatic ring system, and an N-monohalocarbamic acid ester.

Another object is to provide a simple, economically attractive process for making carbamic acid esters which can be readily converted to isocyanates.

Other objects and advantages inherent in the present invention will become apparent from the following description and disclosure.

In accordance with the present invention, it has been discovered that an N-monohalocarbamic acid ester can be caused to undergo addition to an olefinic, carbon-carbon double bond under free radical forming conditions to obtain an N-monosubstituted carbamic acid ester, i.e., one of the amino hydrogen atoms remains intact. The course of this novel reaction proceeds as schematically represented in the following equation:

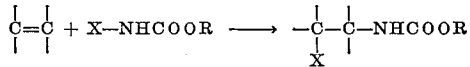

wherein X represents halogen, e.g., bromine, chlorine or iodine and R represents an alkyl or aryl radical.

In practicing the process of the invention, it has been found essential that free radical forming conditions be maintained in order to effect the reaction of the N-monohalocarbamic acid ester and the unsaturated reactant. We have, for instance, obtained excellent yields of the N-monosubstituted carbamic acid ester by bringing the reactants together in the presence of actinic radiation such as, e.g., ultra violet light, which causes the production of free radicals within the reaction media. Another convenient source of free radicals are peroxides whose distinguishing characteristic is the —O—O— grouping. Typical peroxides useful for practicing the invention include hydroperoxides such as hydrogen peroxide, aliphatic hydroperoxides, i.e. methyl hydroperoxide, ethyl hydroperoxide, t-butyl-hydroperoxide, hexyl hydroperoxide, octyl hydroperoxide, trans-decalin hydroperoxide, 1-methy-cyclopentyl hydroperoxide, 1,1 - dimethyl - 2 - propenyl hydroperoxide, 2-cyclohexene-1-yl hydroperoxide, cumene hydroperoxide, tetralin hydroperoxide, triphenyl methyl hydroperoxide, etc.; peroxides of the formula ROOR' wherein R and R', which may or may not be alike, can be alkyl such as methyl, ethyl, propyl, butyl, phenyl, hexyl, heptyl, octyl, nonyl, decyl, undecyl, etc.; aralkyl, i.e., benzyl, phenethyl, phenylpropyl, naphthylmethyl, naphthylethyl, naphthylpropyl, etc.; aryl such as phenyl, naphthyl, etc.; alphatic acyl such as acetyl, propionyl, butyryl, valeryl, etc.; aromatic acyl such as benzoyl, naphthoyl, etc.; peroxy acids, i.e., aliphatic peroxy acids, e.g.; peracetic acid, perpropionic acid, perbutyric acid, etc.; aromatic peroxy acids, i.e., perbenzoic acid, perphthalic acid, etc.; esters of the aforesaid peroxy acids; salts of peracids such as ammonium persulfate, etc. Such per compounds are well known and their description and preparation can be found in the chemical literature. In this connection, reference is made to such well known works as Organic Peroxides by Arthur V. Tobolsky and Robert B. Mesrobian and published by Interscience Publishers, Inc., New York and Interscience Publishers Ltd., London (1954). Other chemical sources of free radicals are likewise known of which 2,2'-azobisisobutyronitrile is especially effective and economical to use.

The use of solvents in carrying out the reaction is advantageous and preferred in certain instances, e.g., where the reaction tends to be excessively exothermic it may be conveniently controlled or mitigated by the employment of a liquid diluent. On the other hand, where the reactants are characterized by a considerable degree of chemical lethargy, it is preferred that the solvent be dispensed with entirely. In general, the process can be effectuated in any of th common organic solvents which are inert toward the reaction components. Solvents which are especially convenient and satisfactory are the chlorinated hydrocarbons such as carbon tetrachloride or the like.

The reaction takes place over a relatively wide range of temperatures. For instance, when employing actinic radiation as a means of promoting the formation of free radicals the process can be conducted sucessfully at temperatures considerably below room temperature. One of the advantages attendant to using low temperatures is that side reactions are minimized thereby increasing the yield of desired product, while facilitating the isolation thereof. But where the free radicals are derived from a chemical source, such as a peroxide, the reaction is desirably performed at moderately elevated temperatures, usually between room temperature and about 100° C. A particularly convenient procedure consists in refluxing the components in the presence of a solvent, the boiling point of which falls within the prescribed temperature range.

In carrying out the process in accordance with the invention, we have found it to be generally applicable to unsaturated organic compounds having at least one carbon-carbon non-aromatic double bond, that is to say, a double bond not constituting part of an aromatic ring system. The essential or requisite skeletal structure of the unsaturated organic compound can be schematically depicted as follows:

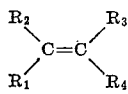

wherein $R_1$, $R_2$, $R_3$, $R_4$ represent a variety of substituents and radicals common to organic compounds including hydrogen. For instance, any one of the radicals may be an aliphatic radical such as alkyl, alkenyl, alkylidene, alkenylidene, aralkyl alicyclic, aryl, aralkyl and the like. It is, of course, to be understood that $R_1$, $R_2$, $R_3$, and $R_4$ can be taken together and thereby constitute a carbocyclic or heterocyclic ring system provided the ring is not of the aromatic type. Defining the above enumerated radicals more specifically any suitable alkyl radical may be used, e.g. methyl, ethyl, n-propyl, isopropyl, isobutyl, n-butyl, tert.-butyl, n-pentyl, n-hexyl, isoheptyl, n-octyl, n-dodecyl, and the like. As examples of a suitable alkenyl radical mention is made of ethenyl, propenyl, 2-butenyl, 1-butenyl, 1-hexenyl, 3-octenyl and the like. Any suitable alicyclic radical may be used such as for example, cyclobutyl, cyclopentyl, cyclohexyl, cycloheptyl, cyclohexenyl, cyclopentadienyl, and the like. It is to be further understood that the above enunciated radicals may in themselves carry various substituents and hydrocarbon residues such as aliphatic and aromatic hydrocarbon radicals and heterocyclic radicals, halogen, e.g. chlorine, bromine, and fluorine, nitro, alkoxy, hydroxy, substituted amides, ester groupings, ether groupings, thio ether groupings and the like. As previously pointed out, the only limitation which is to be imposed on the process is that the unsaturated organic reactant must contain at least one carbon-carbon double bond which is not part of an aromatic ring system, although it will be understood by those skilled in the chemical arts that it may be possible to select unsaturated compounds which are unreactive for reasons, e.g., stearic hindrance, or presence of highly reactive functional groups. Preferably the unsaturated organic reactant will contain from 2–50 carbon atoms.

The N-monohalocarbamic acid esters employed as reactants herein are known compounds which are described in the chemical literature. They are readily prepared by direct halogenation of carbamic acid esters. The lower members are distillable liquids and are relatively storage stable.

The N-monosubstituted carbamic acid esters prepared by the process of the invention constitute a valuable family of organic compounds useful in the chemical and applied arts. An especially important property of N-mono- substituted carbamic acid esters, i.e., the carbamic esters having one amino hydrogen atom remaining intact, is the ease with which they can be converted to isocyanates which are, of course, the starting materials for the production of polyurethane foams and plastics. The isocyanates can be formed by heating a carbamate ester, e.g., an N-monosubstituted ethyl carbamate, commonly in the presence of a chemical agent such as, e.g., phosphorous pentoxide, whereby the elements of alcohol are removed. The resulting isocyanat is isolated by any convenient or suitable method, usually by distillation. Typically one mole of a N-2-chloroalkyl carbamic ethyl ester is refluxed in benzene in the presence of phosphorous pentoxide after which the so-formed N-2-chloroalkyl isocyanate is distilled from the reaction mixture in a 60% yield. For a more detailed description of the aforesaid reaction, reference is made to Wenker, H., J. Am. Chem. Soc., 58, 2608 (1936).

The process of the invention constitutes a highly useful synthetic tool by which bifunctional organic isocyanates can be realized. We can for instance obtain excellent yields of diisocyanates by reacting N-monochlorocarbamic ester with dienes, e.g., the reaction of chlorourethane and octadiene. Due to the great variety and abundance of unsaturated organic compounds, and the general characteristics of our new synthesis, the polyurethane art is thus provided with a host of bifunctional isocyanate intermediates. In this connection, the recently available highly halogenated butadienes when subjected to the process of the invention give rise to a halogenated bifunctional isocyanate from which inert and flameproof polyurethane foams can be produced. Another route whereby dual function isocyanates are realizable using the process of our invention consists in reacting N-monochlorocarbamic ester with an unsaturated N-monosubstituted carbamate such as N-allylcarbamic ester followed by removal of two moles of alcohol from the biscarbamate.

Reference is now made to the following examples which are included solely for the purpose of illustration, since it will be apparent to those skilled in the art that the invention is subject to various modifications without departing from the spirit or scope thereof.

EXAMPLE 1

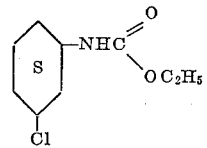

Ethyl N-2-chlorocyclohexylcarbamate

A double wall quartz well is inserted into the center neck of a graduated 250 ml. three-neck reaction flask which is equipped with a gas inlet tube extending to the bottom of the flask and an outlet tube leading through a drying tube to a mercury bubbler.

The flask is charged with 12.4 g. (0.1 mole) of ethyl chlorocarbamate dissolved in 100 ml. of cyclohexene and 1 ml. of acetone as catalyst and the solution cooled to 5° C. by a water-ice bath. A 100-watt Hanovia high pressure, quartz mercury vapor lamp is introduced into the quartz well. Heat transfer is minimized by evacuating the space between the walls of the quartz well. The U.V. irradiation is maintained for 3 hours at 5° C. to 10° C,. while nitrogen is bubbled into the reaction mixture to agitate the reactants. At the end of this time the excess cyclohexene is stripped off at reduced pressure and the oily residue distilled at high vacuum. The main fraction, a yellow oil, is obtained in approximately 50% yield; B.P. 82° C./0.1 mm.; $n_D^{24}$ 1.4844. The structure of the purified product is confirmed by elemental and spectroscopic analysis.

EXAMPLE 2

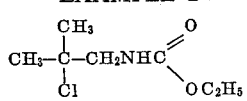

Ethyl N-2-chloro-2-methylpropylcarbamate

The apparatus used for this procedure is the same as the one used in the preceding process.

The reaction flask is charged with a mixture of 12.4 g. (0.1 mole) of ethyl chlorocarbamate, 1 ml. of acetone as catalyst and 100 ml. of carbon tetrachloride. This solution is cooled down to −15° C. by an acetone-dry ice bath. The U.V. light is switched on after which 20 grams of isobutylene is gradually bubbled through the reaction solution at −15° C. The U.V. irradiation is continued for 3 hours at −15° C. to −10° C.

After evaporating the excess isobutylene and carbon tetrachloride, the crude material is distilled at reduced pressure. There is obtained in a 25% yield a colorless oil, B.P. 50°/0.5 mm. Hg; $n_D^{22}$ 1.4769.

EXAMPLE 3

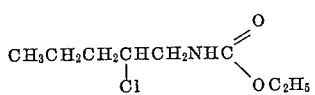

Ethyl 2-chloro-n-pentylcarbamate

The above depicted product is prepared in accordance with the procedure of Example 2, but using an equivalent amount of 1-pentene in lieu of isobutylene. In general, the results parallel those of the previous example.

EXAMPLE 4

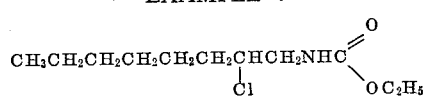

Ethyl-2-chloro-n-octylcarbamate

This product is prepared analogous to Example 1 from 20 g. (0.16 mole) of ethyl chlorocarbamate and 27 g. (0.16 mole plus 50% excess) of octene-1. The purified product is a colorless liquid; B.P. 115–6° C./0.1 mm.; yield 23 g. (60%). The structure is confirmed by elemental and infrared analysis; $n_D^{23}$ 1.4650.

EXAMPLE 5

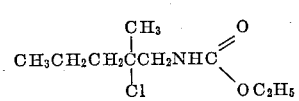

Ethyl N-2-methyl-2-chloro-n-pentylcarbamate

In a 250 ml., 3-neck flask, equipped with stirrer, thermometer, condenser and dropping funnel is dissolved 10.5 g. (.068 mole plus a 40% excess) of 2-methylpentene-1 in 75 ml. of carbon tetrachloride and 0.5 g. of 2,2′-azobisisobutylnitrile as catalyst. To this mixture is added dropwise, at room temperature, 8.5 g. (.068 mole) ethyl chlorocarbamate. After the addition the reaction mixture is refluxed for 3 hours, and then distilled at reduced pressure. The fraction boiling at 130° C./0.1 mm. is the desired product; yield 7.0 g. (50%); $n_D^{23}$ 1.4583.

EXAMPLE 6

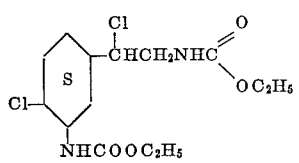

In a 250 ml., 3-neck flask, equipped with stirrer thermometer, condenser and dropping funnel is dissolved 10.8 g. (0.1 mole) of 4-vinylcyclohexene-1 in 100 ml. of carbon tetrachloride and 1.0 g. of 2,2′-azobisisobutylnitrile as catalyst. To this mixture is added dropwise, at room temperature, 24.6 g. (0.2 mole) ethyl chlorocarbamate. After the addition the reaction mixture is stirred at room temperature for 8 hours, and then distilled at reduced pressure to remove side products. The product is an undistilled viscous oil. Analytical data confirm the structure.

Using the procedures of the previous examples, the following can be prepared:

EXAMPLE 7

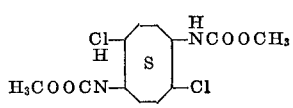

EXAMPLE 8

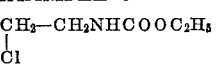

EXAMPLE 9

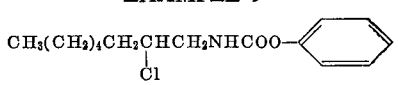

EXAMPLE 10

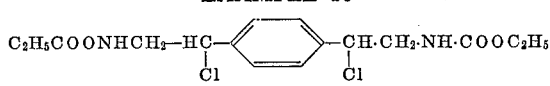

EXAMPLE 11

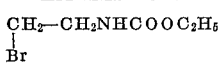

EXAMPLE 12

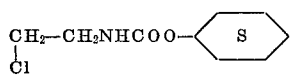

In those examples which utilize U.V. light, the purpose of the acetone is to serve as an absorber of the radiant energy whereby the activated acetone molecules transfer their energy to the reaction media resulting in more effective generation of free radicals.

EXAMPLE 13

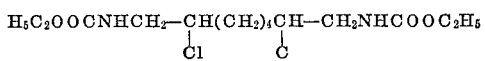

2,7 dichlorooctyl biscarbamate

In a 250 ml., 3 neck flask, equipped with stirrer, thermometer, condenser and dropping funnel is dissolved 8.5 g. (0.068 moles plus a 40% excess) of ethyl monochlorocarbamate in 75 ml. of carbon tetrachloride and 0.5 g. of 2,2′-azobisisobutylnitrile. To this mixture is added dropwise, at room temperature, 3.7 g. (0.034 mole) of 1,7 octadiene. After the addition, the reaction mixture is refluxed for 3 hours and then flash distilled. The above represented solid product remains which is purified by crystallization.

EXAMPLE 14

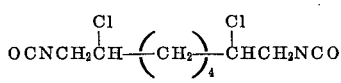

2,7 dichlorooctyl diisocyanate

In 50 ml. of benzene is suspended 10 grams (0.028 mole) of the bis carbamate and 6.3 g. (0.04 M) of phosphorus pentoxide. The reaction mixture is refluxed for 2 hours. After the reflux period, the mixture is cooled, filtered and flash distilled. A colorless liquid remained which has a strong band (2250 cm.⁻¹/NCO) in the infrared spectrum indicating the above represented product.

The following examples are presented which are carried out in the absence of free radical forming conditions, i.e., in the absence of either actinic radiation or chemical free radical producing agents. It is apparent from these examples that no N-monosubstituted carbamic acid ester is produced under these conditions.

EXAMPLE 15

Styrene in the amount of 6.8 grams is dissolved in 75 cc. of dimethyl formamide and ½ gram of sodium hydroxide (catalyst). Ethylmonochlorocarbamate (0.065 M) is added dropwise until 8 grams is introduced. Slight heating is observed indicating an exothermic reaction. The reaction mixture is then heated at 100° C. for three hours. The resulting mixture is permitted to cool and is filtered. The solvent is removed by flash-evaporation, and the residue is distilled. Analysis of the fraction after removal of the N-chloroethyl carbamate indicates that the desired product is not obtained.

EXAMPLE 16

Ethylmonochlorocarbamate (0.1 M) in the amount of 12.4 grams and 0.3 gram of para-toluenesulfonic acid (catalyst) is dissolved in carbon tetrachloride. Isohexene (0.1 M) in the amount of 8.2 grams is then added to the solution and the mixture is heated and refluxed for three hours. At reflux the solution appears to be cloudy. At the end of the three hours the mixture is distilled at reduced pressure. Analysis indicates that no addition to the N-chloroethyl carbamate took place under these conditions.

EXAMPLE 17

N-chloroethyl carbamate (0.57 M) in the amount of 8 g. is added to 10 cc. of t-butyl alcohol in a flask contained within an ice salt bath for the purpose of maintaining the temperature of the carbamate between 5–15° C. Cyclohexene (.072 M) in the total amount of 6 g. is added dropwise to the surface of the carbamate material maintained within the aforesaid temperature range. The mixture is allowed to reside in the flask for a period of three hours. The resulting reaction mixture is then distilled and analyzed. No N-monosubstituted ester is detected.

What is claimed is:

1. A process for preparing an N-monosubstituted carbamic acid ester of the type

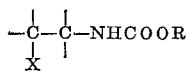

where X is selected from the group consisting of chlorine, bromine and iodine and R is selected from the group consisting of alkyl and aryl which comprises: reacting in the presence of actinic radiation or a chemical agent for producing free radicals an N-monohalocarbamic acid ester with an unsaturated organic compound having at least one non-aromatic carbon to carbon double bond, and isolating the thus formed N-monosubstituted carbamic acid ester.

2. The process of claim 1 in which free radical producing conditions are maintained by actinic radiation.

3. The method of claim 2 in which said actinic radiation comprises ultraviolet light.

4. The process of claim 1 in which said free radical producing conditions are maintained by admixing with the N-monohalocarbamic acid ester and the unsaturated organic compound a chemical agent for producing free radicals.

5. The process of claim 4 in which said chemical agent comprises a peroxide.

6. The process of claim 4 in which said chemical agent comprises 2,2'-azobisisobutyronitrile.

7. The process of claim 1 in which the reaction is carried out in the presence of a liquid organic solvent which is inert with respect to said reactants.

8. The process of claim 7 in which said solvent comprises carbon tetrachloride.

9. The process of claim 1 in which said N-monohalocarbamic acid ester comprises an N-monochlorocarbamic acid ester.

10. The process of claim 9 in which said N-monochlorocarbamic ester comprises ethyl monochlorocarbamate.

11. The process of claim 1 in which said unsaturated organic compound contains between 2–50 carbon atoms.

12. The process of claim 11 in which said unsaturated organic compound contains one non-aromatic carbon to carbon double bond.

13. The process of claim 12 in which said unsaturated organic compound comprises cyclohexene.

14. The process of claim 12 in which said unsaturated organic compound comprises isobutylene.

15. The process of claim 12 in which said unsaturated organic compound comprises 1-pentene.

16. The process of claim 12 in which said unsaturated organic compound comprises octene-1.

17. The process of claim 12 in which said unsaturated organic compound comprises 2-methylpentene-1.

18. The process of claim 12 in which said unsaturated organic compound comprises 4-vinylcyclohexene-1.

19. The process of claim 11 in which said unsaturated compound contains two non-aromatic carbon to carbon double bonds.

20. The process of claim 19 in which said unsaturated compound comprises octadiene.

References Cited

UNITED STATES PATENTS 2,772,306   11/1956   Thomas _____ 260—482

HOWARD S. WILLIAMS, Primary Examiner

U.S. Cl. X.R.

204—158; 260—468, 482

PO-1050
(5/69)

UNITED STATES PATENT OFFICE
CERTIFICATE OF CORRECTION

Patent No. 3,477,933               Dated November 11, 1969

Inventor(s) Walter A. Stamm et al.

It is certified that error appears in the above-identified patent and that said Letters Patent are hereby corrected as shown below:

In the Specification, Column 1, line 56, "fomed" should read -- formed --.

Column 2, line 39, "methy" should read -- methyl --.

Column 2, line 48, "alphatic" should read -- aliphatic --.

Column 2, line 72, "th" should read -- the --.

Column 3, line 7, "sucessfully" should read -- successfully --.
Column 3, line 36, after "alkenylidene" and before "aralkyl" ins -- alkylene -- which was omitted.
Column 3, line 57, "improsed" should read -- imposed --.

Column 4, line 10, "isocyanat" should read -- isocyanate --.

Column 6, line 43, the formula:

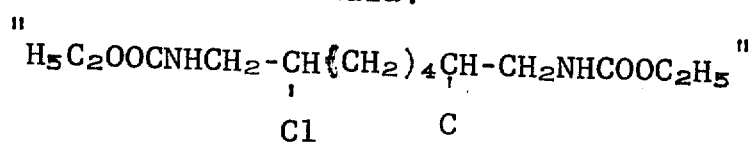

should read:

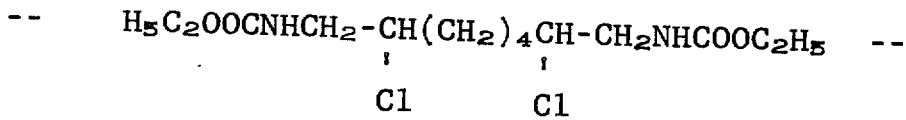

Column 6, line 47 "funel" should read -- funnel --.
Column 6, line 64, "mole" should read -- moles --.
Column 7, line 16, "gram" should read -- grams --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents